March 8, 1960 — O. T. McILVAINE — 2,928,025
AUTOMATIC HEADLIGHT DIMMING APPARATUS
Original Filed April 21, 1954 — 2 Sheets-Sheet 1
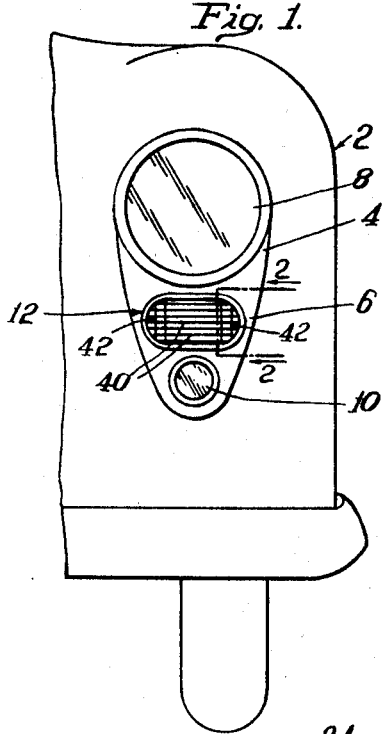
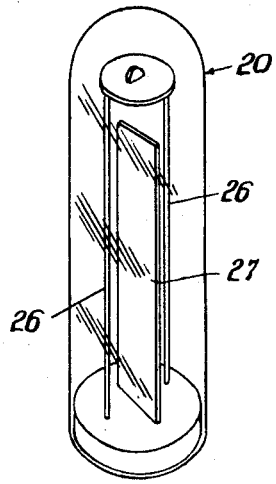
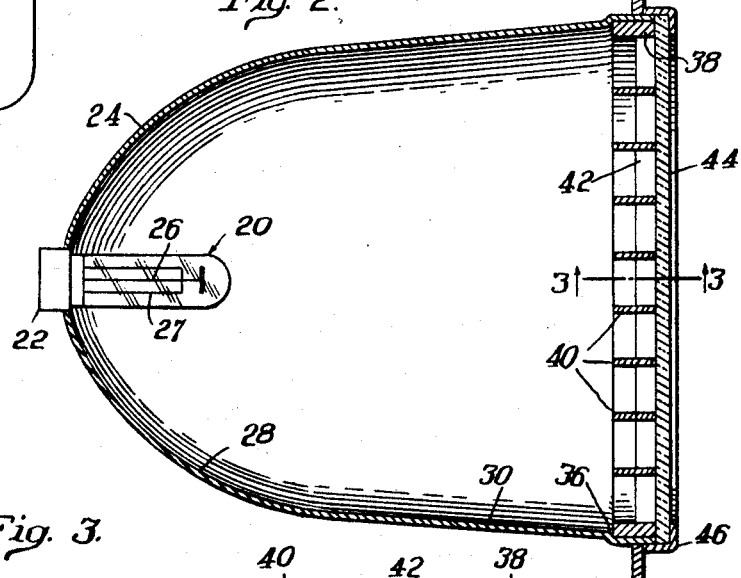
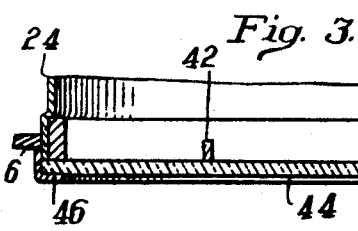
INVENTOR
Oran T. McIlvaine
BY
ATTORNEYS March 8, 1960 O. T. McILVAINE 2,928,025
AUTOMATIC HEADLIGHT DIMMING APPARATUS
Original Filed April 21, 1954 2 Sheets-Sheet 2
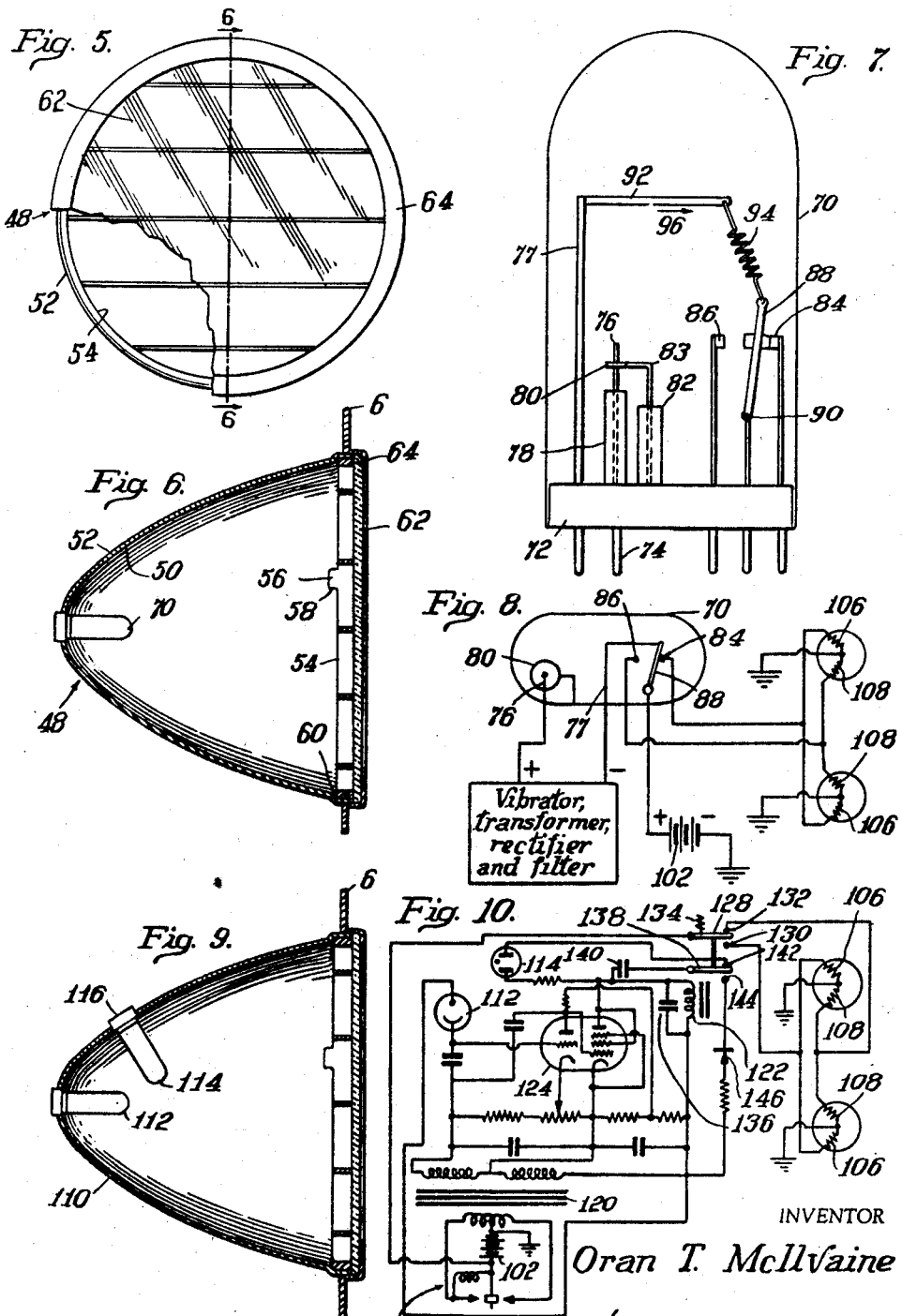
INVENTOR
Oran T. McIlvaine
ATTORNEYS United States Patent Office 2,928,025
Patented Mar. 8, 1960

2,928,025

AUTOMATIC HEADLIGHT DIMMING APPARATUS

Oran T. McIlvaine, Geneva, Ill.

Original application April 21, 1954, Serial No. 424,656, now Patent No. 2,884,564, dated April 28, 1959. Divided and this application March 16, 1959, Serial No. 799,572

6 Claims. (Cl. 315—83)

This application is a division of my application for Automatic Headlight Dimming Apparatus filed April 21, 1954, Serial No. 424,565, now Patent No. 2,884,564, granted April 28, 1959.

This invention relates to automatic headlight dimming apparatus for effecting the automatic control of multi-beam headlights on vehicles.

Prior to the present invention, many attempts have been made to provide practical apparatus for automatically dimming the headlights of automobiles upon the approach of another vehicle from the opposite direction. Such apparatus is intended to relieve the driver of the obligation to dim the headlights, and in this manner to increase his comfort and also to reduce the likelihood that the headlights will not be dimmed on certain occasions through negligence.

The prior art apparatus has utilized a conventional photoelectric cell mounted on the automobile just behind the windshield or in the middle of the grill, to receive light from oncoming vehicles, and a relay positioned somewhere under the hood of the automobile and arranged to be actuated in response to action of the photoelectric cell. The relay controls the headlight circuit, and its actuation controls the bright and dim circuits of the headlights. Amplifiers are usually included in the system between the photoelectric cell and the relay to amplify the signals sufficiently for the proper operation of the relay. Some systems utilize a lens or combination of lenses, positioned in front of the photoelectric cell to collect the light emanating from the approaching vehicle and focus it upon the photoelectric cell.

All of the prior art efforts have been subject to certain practical difficulties, which are overcome by the present invention.

One such difficulty arises in connection with the mounting of the photoelectric cell detector unit on the vehicle. If the unit is positioned behind the windshield, it obstructs the vision of the driver and is unsightly in appearance. If it is mounted in the middle of the grill, the cost of installation is too great, for in this case, it is necessary to form an extra opening in the body of the vehicle during the manufacture thereof and to include an extra operation in the final assembling process.

Furthermore, the detectors used heretofore were not sufficiently reliable in operation. In order to be useful at all, apparatus of this type must be almost perfect with respect to its reliability. The driver cannot have confidence in a system that works only part of the time. The lenses are quite satisfactory on straight, level roads, and serve to provide a measure of discrimination as between light sources because they magnify the intensity of the light only when such light is approaching the detector along a line nearly parallel to the axis of the lens. On a straight road the light from approaching vehicles is about the only light which could approach the detector from such an angle.

However, the lens arrangements are most unsatisfactory when the automobile is travelling along a road with curves in it. Here, the very thing which provides the discrimination when the vehicle is travelling along a straight road, i.e., the restriction upon the angle of incidence of the effective light rays, prevents actuation of the photoelectric cell by the rays emanating from the headlights of a vehicle approaching from around a curve. It frequently happens in the use of the lens system of this type that the dimming of the lights does not occur until the vehicles are very close to each other, and dangerous blinding of the approaching driver results.

In the prior art detectors having no focusing lenses, there is almost no discrimination between the various light sources. The photoelectric cells are actuated by such extraneous light sources as street lamps, highway signs, and even the glare of the road surface. The unnecessary dimming operations thus produced are annoying and also dangerous to some extent in that they greatly reduce the length of the illuminated stretch of roadway in front of the vehicle.

The apparatus of the present invention embodies a number of features which cooperate to overcome effectively all of these difficulties which arise in connection with the prior art apparatus. Instead of a separate detector unit mounted behind the windshield or in the middle of the grill of the automobile, I have combined the detector with a conventional headlight and a parking light and turn indicator to form an illumination unit. By forming these elements as a single unit which can be installed in a single operation, the cost is materially reduced.

Another feature which may be used, if desired, to lower the cost of installing and maintaining the automatic dimming equipment, is the elimination of a separate relay unit from the system. This is accomplished by utilizing light-actuated switching means in place of the conventional photoelectric cell in the detector.

The novel light-actuated switching means which may be used with this invention, is in the form of an electron discharge tube having a cathode, a light-sensitive grid, an anode, a pair of fixed contacts and a movable contact. The cathode is formed so as to be distortable upon changes in the temperature thereof and is connected to the movable contact. Light falling upon the light-sensitive grid causes the emission of electrons therefrom, and the movement of these electrons through the gas with which the tube is filled results in the ionization of the gas and firing of the tube. The current flow between the cathode and the anode while the tube is firing causes the cathode to heat up and be distorted appreciably. The movement of the cathode thereby is utilized to move one contact from engagement with one of the fixed contacts into engagement with the other of the fixed contacts. The contacts are in the bright and dim circuits of the headlights and, consequently, the light-actuated switching apparatus of this invention accomplishes the dimming of the headlights directly and without the necessity for using a relay.

The detector that may be used according to this invention is made more reliable by providing the detector with a reflector element which will collect light from the headlights of the approaching vehicle and focus it upon the light-sensitive element of the detector. The reflector is much more satisfactory as a light collecting device than the lens systems used heretofore, because it permits the collection of light from sources disposed at fairly large angles in the horizontal plane from its axis. This means that the light from a vehicle approaching from around a curve will be received by the reflector and directed to the light-sensitive element to actuate it.

Proper discrimination as between various light sources is attained by a combination of features. The front end portion of the reflector is preferably much wider than it is high so that the angle through which light may be admitted is greater in the horizontal plane than in the vertical plane. This helps to prevent actuation of the detector by such light sources as street lamps and the glare of the road surface.

Further and more effective restriction of the vertical angle of admittance of light rays to the detector is accomplished by the provision of a louver panel in front of the reflector. This louver panel includes horizontally disposed louver strips of such width and spacing as to prevent the entrance of light from sources disposed substantially above and below the horizontal axis of the detector. The louver panel may also include, if desired, vertical louver strips on one or both sides of the detector to restrict the collection of light from sources disposed at wide angles in the horizontal plane.

The effect of light sources located above and below the horizontal axis of the detector is further reduced by utilizing a light-sensitive element which is in the form of a thin plate disposed with its faces in vertical planes. It will be apparent that this arrangement accentuates the effectiveness of light approaching substantially horizontally, while minimizing the effectiveness of light approaching from other angles.

A more complete understanding of this invention and its many advantages will become apparent from the following detailed description when considered in connection with the accompanying drawings in which:

Fig. 1 is a front elevation view at the left side of an automobile, showing the detector unit of this invention applied thereto;

Fig. 2 is a detail vertical sectional view taken along line 2—2 in Fig. 1, showing one form of detector according to this invention and the means for attaching the combination unit to the body of the vehicle;

Fig. 3 is a detail horizontal sectional view taken along line 3—3 in Fig. 2;

Fig. 4 is a perspective view of one form of photoelectric cell which may be used in the detector;

Fig. 5 is a front elevational view of another form of detector that may be used with the present invention;

Fig. 6 is a vertical sectional view therethrough taken on the line 6—6 in Fig. 5;

Fig. 7 is a side elevational view of a light-actuated switching device that may be used in accordance with this invention;

Fig. 8 is a circuit diagram, illustrating the use of the device shown in Fig. 7 in controlling the dimming of automobile headlights;

Fig. 9 is a section similar to Fig. 6, but shows another modification; and

Fig. 10 is a diagram of a circuit for use with the detector unit of Fig. 9.

Referring more particularly to the drawings, Fig. 1 shows the illumination unit 4 of an automobile, designated generally by the numeral 2. Most of the automobile has been broken away in this view, because it was not necessary in order to illustrate the relationship between the illumination unit and the automobile. The illumination unit 4 comprises a frame 6, the front surface of which may be suitably treated to present a desirable appearance. Mounted in the frame 6 are a headlight 8 of conventional multi-beam construction, a combination parking light and turn indicator 10, also of conventional construction, and a detector 12.

The illumination unit 4 may be attached to the body of the vehicle in any suitable manner, as by a number of bolts, one of which is shown at 14 in Fig. 2. These bolts pass through flange-like ears 16, projecting rearwardly from the frame 6, and through similar ears projecting rearwardly from the edge of the opening in the body of the automobile. There may be a number of bolts 14, and these assure the rigid attachment of the illumination unit 4 to the vehicle body.

The details of construction of one form of detector, according to this invention, are shown in Fig. 2. A light-sensitive tube 20 is mounted in a socket 22, disposed at the rear end of a reflector 24 attached by brackets, not shown, to the illumination unit frame 6.

One form of light-sensitive tube 20 that may be used, is illustrated in Fig. 4. This includes a pair of anodes 26 disposed on opposite sides of a light-sensitive cathode 27. The cathode 27 is in the form of a thin plate. The tube is preferably plugged into the socket 22 with the faces of the cathode 27 disposed in vertical planes. Other types of tubes may be used, however, if desired. For example, the tube shown in Fig. 7 or in my prior Patent No. 2,307,697, has advantages which may justify use thereof in place of the tube construction shown in Fig. 4.

The inner surface of the reflector 24 is preferably in the shape of a paraboloid, at 28, with the light-sensitive element of the photoelectric tube 20 at its focal point. As shown in Fig. 2, the parabolic surface 28 is at the rear portion of the reflector with a forward portion 30, having substantially flat top and bottom walls, sloping away from the reflector axis at smaller angles than the side walls. The side walls of this forward portion 30 of the light-reflecting surface are preferably continuations of the parabolic rear portion 28.

The reflector 24 should be large enough to admit sufficient light for the operation of the photoelectric tube, but it should not be so large as to give an unsightly appearance to the illumination unit. A range of suitable sizes would be from one and one-half to seven inches, as measured along the horizontal line connecting the centers of the forward edges of the walls of the reflector, as viewed in Fig. 1.

Near the front end of the reflector 24, the inner surface is provided with a shoulder 36, against which the frame portion 38 of the louver panel is positioned in this embodiment. By reason of the elongated shape of the front end of the reflector 24, as viewed in Fig. 1, the louver panel is necessarily oriented as to the vertical and horizontal directions when it is inserted into the reflector to bear against the shoulder 36. The louver panel includes horizontal louver strips 40 and vertical louver strips 42.

All of the strips should be painted black on both sides, or otherwise treated, to prevent the reflection of light from their surfaces so that practically all of the light going to the reflector 24 must pass directly through the spaces between the louver strips. The width and relative spacing of the louver strip elements may be varied as desired to control the angle of admission of light to the reflector. The arrangement shown in Figs. 2 and 3 is merely an example of various dispositions which may be used for particular locations.

The louver panel is maintained in position against the shoulder 36 by means of a clear, transparent cover plate 44, mounted at the outer end of the reflector 24, as by means of a holding ring 46, the rear end of which is fastened to the reflector 24 by set screws or other fastening devices, not illustrated. The cover plate 44 serves to prevent the entrance of dirt, insects and other foreign objects into the reflector.

It will be seen that the detector of this invention includes a number of features which cooperate to make the operation thereof more reliable. The concave light-reflecting surface 28 is shaped so as to collect the light falling upon the detector and to direct it onto the light-sensitive element 27 of the tube 20. The vertical disposition of the light-sensitive element 27 in the detector minimizes the effects produced by light falling upon the tube 20 from above or below, and thereby reduces the likelihood of actuation of the detector by light from street lamps or from the road surface.

The relatively small slope of the top and bottom walls of the forward portion 30 of the light-reflecting surface 28 permits the vertical dimension of the forward end of the reflector to be substantially less than its horizontal dimension. This shape serves to reduce the amount of light which is collected by the reflector from sources above and below it, thereby complementing the effect produced by the vertical disposition of the light-sensitive element 27.

By proper selection of the width and spacing of the louver strips 40 and 42 of the louver panel, it is possible to restrict the angle of entrance of light into the reflector to any desired range. Ordinarily, it is preferable that the horizontal louver strips 40 be relatively wide and closely spaced so as to restrict the light entering the reflector to an angle approaching the horizontal. However, these dimensions must be determined carefully, considering the conditions to be met in use and the terrain to be encountered. The vertical louver strips 42 are of lesser importance and in some instances they could be omitted entirely. They must not be allowed to interfere with the collection of light from vehicles approaching from around curves.

Figs. 5 and 6 illustrate a modification of the detector of this invention, designated generally at 48, which is similar in many respects to the embodiment already described. Here, however, the entire light-reflecting surface 50 of the reflector 52 is shaped as a paraboloid and the entrance end of the reflector is circular, as seen in Fig. 5. A reflector of this shape has considerably greater light-gathering power than one of the shape shown in Figs. 1 and 2, and the use of such a reflector may be preferred in some instances. The diameter of the entrance end of the reflector should be between one and one-half inches and seven inches.

In securing the louver panel 54 to the reflector 52, it is desirable to provide the frame of the louver panel with a rearwardly extending key 56 engageable in a slot 58 in the shoulder 60, formed on the inner surface of the reflector. The location of the key 56 in the slot 58 assures the directional orientation of the louver elements. The louver panel 54 is shown as having only horizontal louver strips, but it will be understood that vertical strips may also be provided, if desired. The glass plate 62 and the fastening ring 64 are similar to the corresponding elements shown in Fig. 2, except for their shape.

Although the photoelectric tube used in the embodiment illustrated in Figs. 5 and 6 may be of the type shown in Fig. 4, the vertical plate form of light-sensitive element is not essential with this form of reflector. For example, a photothyratron tube such as that disclosed in my Patent No. 2,307,697, may be employed to actuate a switching relay directly, without requiring amplification of the signal from the light-sensitive cell. Moreover, light-actuated switching means, such as that shown in Fig. 7, might be used to eliminate both the amplifier and the switching relay.

Fig. 7 shows one form of light-actuated switching means that may be used with the present invention. This includes a gas-filled envelope 70 having a transparent window, a base 72, and a plurality of terminal pins 74, adapted for insertion in a socket to provide the electrical connections for the various elements inside the envelope 70. An element 77 serves as an electronic tube cathode which cooperates with an anode 76, protruding from a supporting stud 78, and a loop grid element 80 encircling the anode 76 and supported by a stud 82 and wire 83. The wire 83 need not be connected to any of the terminals 74, inasmuch as it serves only as a support for the grid 80.

The electronic tube cathode 77 is preferably bi-metallic, being made up of two dissimilar metals arranged so that the element will deform or bend when heated. The grid element 80 is coated with a light-sensitive material, such as caesium, so as to form a photo-cathode. In the present tube, the element 80 serves as a control element or grid to control the current flow between the electronic cathode 77 and the anode 76.

When light falls on the photo-cathode 80, electrons are emitted from the surface thereof and directed toward the anode 76. The movement of the electrons through the gas causes ionization of the gas and firing of the tube. The current flow between the anode and electronic cathode 77, which occurs when the resistance between these elements is lowered by the ionization of the gas, causes the electronic cathode 77 to be heated by the cathode glow. The increase in temperature of the bi-metallic electronic cathode 77 produces a deformation, which is utilized in a manner explained below, to accomplish the switching operation.

In another portion of the tube is located a pair of relatively fixed contacts 84 and 86. These are alternately engaged by a movable contact member 88, pivoted as at 90. The deformation of the electronic cathode 77 is translated into motion of the movable contact 88, by means of an insulated connector rod 92 attached to the upper end of the electronic cathode 77 and extending across the tube to a point above the movable contact 88. The end of the connector rod 92 is coupled to the movable contact 88 by means of a compression spring 94, the ends of which are attached, respectively, to the connector rod 92 and to the movable contact 88.

As long as the bi-metallic member 77 is cool, the axis of the compression spring 94 is inclined in one direction with respect to the vertical, and the movable contact 88 is caused to engage one of the fixed contacts, as 84. When the tube fires, and the temperature of the bi-metallic member 77 rises, the bi-metallic member bends and shifts the connector rod 92 in the direction of the arrow 96 in Fig. 7, to change the inclination of the compression spring 94 and cause the movable contact 88 to snap over into engagement with the other fixed contact, 86. When the light ceases to fall upon the photo-cathode 80, firing of the tube also ceases, and the bi-metallic member 77 cools to return the movable contact 88 into engagement with the fixed contact 84.

Certain variations in the construction of this switching apparatus will be apparent. For example, the deformation used to bring about the switching of the contacts might be the linear expansion of a brass strip rather than the bending of a bi-metallic element. Also, the heat distortable member could be the movable contact. In this case, the movement back and forth between the two fixed contacts would be relatively slow, however, as the movement would correspond to the rate of change of the temperature of the member. Ordinarily, this type of action is not as desirable as the snap action achieved by the structure illustrated in Fig. 7, but there may be situations in which it would be desirable.

It will also be apparent that the principles of the switching apparatus of this invention are not restricted to the inclusion in the tube of a light-sensitive element. The firing of the tube might be in response to control signal potentials impressed upon a conventional grid instead of in response to the incidence of light upon a light-sensitive element. Switching apparatus of this type might be used in conventional dimming systems in place of the usual amplifier and relay elements, the signals from the photoelectric cell being transmitted to the grid element.

Fig. 8 illustrates the use of the light-actuated switching apparatus of Fig. 7 in the dimming of automobile headlights. The conventional automobile battery 102 is connected through conventional vibrator, transformer, rectifier, and filter apparatus to the anode 76 of the tube 70. The rectifier and filter might be omitted as the tube will operate on alternating current, as well. Of course, the reason for providing the vibrator and associated equipment is to raise the voltage of the battery to a sufficient value, as from 100 to 200 volts, for example, for operating the tube. The fixed contact 84 is in circuit with the bright filaments 106 of the headlights of the automobile and, normally, the engagement of the movable contact 88 with the fixed contact 84 completes the circuit from the battery 102 through these bright filaments 106. Movement of the movable contact 88 into engagement with the fixed contact 86 closes the circuit from the battery 102 through the dim filaments 108 of the headlights. This dimming of the headlights occurs automatically in response to the reception of light from an oncoming vehicle falling or being reflected onto the photo-cathode 80, as will be apparent from the above discussion.

It is pointed out that the timing of the switching operations in the circuit of Fig. 8 is novel and highly advantageous. The dimming of the headlights does not occur immediately upon the reception of light from the headlights of an approaching vehicle but is delayed for a short time while the cathode 77 heats up sufficiently to snap the movable contact 88 into engagement with the fixed contact 86 in the dim circuit. This delay has a duration of from two-tenths to four-tenths of a second and covers the period when the light falling on the light-sensitive element 80 is of borderline intensity to prevent flashing of the headlights back and forth between bright and dim.

After the light from an approaching vehicle goes off the light-sensitive element 80, there will be another delay period before the return of the headlights to bright, and momentary removal of the light from the detector, such as might occur in a meeting situation on a hill, is not effective to return the lights to bright. The delay circuit illustrated in Fig. 10 will provide for this delay.

In the embodiment of the invention shown in Fig. 9, the reflector 110 and associated parts may be the same as those described above in connection with Fig. 2 or Fig. 6, and the photoelectric cell 112 may be of any of the types already mentioned. This embodiment differs from those described in that a space discharge tube 114, containing a rare element gas, such as argon, neon, xenon, etc. is mounted in a socket 116 on the reflector 110. When this tube is illuminated, the light therefrom falls on the photoelectric cell 112 to actuate it.

A circuit in which the structure of Fig. 9 is utilized to produce novel delay effects is illustrated in Fig. 10. The automobile battery 102 is connected to a conventional vibrator 118 and a transformer 120, to step up the voltage to about 500 volts. A relay 122 is normally energized from the high voltage winding of the transformer 120 through the pentode section of a triode-pentode tube 124, but the pentode section of the tube 124 will be blocked and the relay 122 deenergized when light falls on the light-responsive device 112, such as a conventional photoelectric cell.

A movable contact 128 on the relay 122 is connected to the battery 102 to supply current alternately to the bright filaments 106 and the dim filaments 108 of the headlights through fixed contacts 130 and 132, respectively. The movable contact 128 is biased toward engagement with the fixed contact 132 as by a spring 134 so that the dim filaments 108 will be energized whenever the relay 122 is not exerting sufficient force to overcome the bias of the movable contact 128. With this arrangement the dim filaments 108 will be energized initially while the control circuit is warming up, and then the control circuit will regulate the energization of the filaments 106 and 108.

In order to prevent deenergization of the relay 122 by quick flashes of light, a condenser 136 is connected across its coil as shown. This condenser is of such size as to hold the relay in the energized condition for an interval of time, such as from about two-tenths of a second to one second, after the pentode section of the tube 124 is blocked. It will be seen that this interval corresponds to the interval required for the heating up of the element 77 in the embodiment illustrated in Fig. 7.

The relay 122 is provided with another movable contact 138 connected to a condenser 140 and arranged to cooperate with a pair of fixed contacts 142 and 144. The movable contact 138 is biased by the spring 134 toward engagement with the fixed contact 142 to complete a circuit which includes the condenser 140 and the neon tube 114 (Fig. 9). Upon energization of the relay 122, however, the movable contact 138 moves to engage the fixed contact 144. The fixed contact 144 is connected to the high voltage winding of the transformer 120 through a rectifier 146.

In operation, the condenser 140 is charged each time the relay 122 is energized and is discharged through the neon tube 114 when the relay 122 is deenergized. During the interval required for the discharge of the condenser 140, the neon tube 114 will be illuminated so as to assure continued operation of the photo-electric cell 112. The size of the condenser 140 is such that this interval, preferably, will be from three to fifteen seconds. When the condenser 140 is fully discharged, the neon tube 114 will be deenergized, and if no other light is falling on the cell 112, the relay 122 will be energized again to switch the headlights from dim to bright and instantly recharge the condenser 140.

While the neon tube 114 is illuminated, removal from the cell 112 of the light coming from the headlights of an approaching vehicle, such as might occur in a meeting situation on a hill or on a curve, will not be effective to return the lights to bright. This is an important feature because it prevents accidental blinding of the approaching driver due to terrain irregularities.

It will be understood that a neon tube and condenser may be, and preferably are, associated with the light-actuated switching apparatus of Fig. 7 to provide a delay period after the switching of the headlights to dim during which they may be returned to bright. These elements have been omitted from the circuit diagram of Fig. 8 in the interests of simplicity and clarity, but persons skilled in the art will have no difficulty in visualizing the necessary circuit connections.

The heating of the cathode will provide perhaps .2 to .4 second, but a longer time is not desirable here. This is sufficient to prevent quick flashes of light from operating the unit, and in the case of a standard light-responsive cell and amplifier, this delay is secured by the condenser 136 across the relay. The neon light 114 provides the 3 to 15 seconds delay that has been found desirable after the unit first goes to dim. This delay then expires and the light from the oncoming car holds it dim. In this way, as soon as the car passes, the lights are back bright at once, which is quite important, since this is the time that the driver's eyes are still blinded and the bright lights help to recover faster. If the cathode had to cool down, this would cause the lights to be dim after the car passed.

These delays are quite important to a successful dimmer, and the proper sequence of them. When light strikes the dimmer, there will be a .2 to 1.0 second delay before the dimmer operates. After the dimmer operates, there will be a 3 to 15 seconds delay before it will return, even though the light is removed. There will be instant return, or practically so, to bright after light is removed from the dimmer.

Since various modifications of this invention will be apparent to persons skilled in the art, the foregoing disclosure of specific embodiments of the invention is to be considered as exemplary only and the scope of the invention is to be ascertained from the claims which follow.

I claim:

1. Apparatus for automatically dimming a vehicle headlight upon the approach of another lighted vehicle from the opposite direction comprising a photoelectric cell and a reflector associated therewith having a concave light-reflecting surface for collecting light emitted by the approaching vehicle and directing it onto said photoelectric cell, said light-reflecting surface including a rear portion shaped as a paraboloid disposed so that said cell is near the focal point thereof and a forward portion having curved side walls forming continuations of said paraboloid and top and bottom walls sloping away from the reflector axis less than said side walls, whereby the collection of light from sources above and below the axis of said reflecting surface is minimized without materially affecting the collection of light from sources disposed at angles in the horizontal plane from said axis.

2. Apparatus for automatically dimming a vehicle headlight upon the approach of another lighted vehicle from the opposite direction comprising a photoelectric cell including a light-sensitive element shaped as a thin strip having faces of substantial width and length and means for mounting said photoelectric cell on the vehicle with the faces of the light-sensitive element disposed vertically so as to minimize the effect on said element of light approaching said cell from sources located substantially above and below the cell.

3. Apparatus for automatically dimming a vehicle headlight upon the approach of another lighted vehicle from the opposite direction comprising a photoelectric cell including a light-sensitive element shaped as a thin strip having faces of substantial width and length, a reflector having a light-reflecting surface disposed around said photoelectric cell for collecting light emitted by the approaching vehicle and directing it onto said cell, said light-reflecting surface including a portion disposed forwardly of said cell having a pair of opposed walls spaced a short distance apart and a pair of opposed concave walls spaced a larger distance apart, and means for mounting said photoelectric cell and said reflector on said vehicle with the faces of said light-sensitive element and said concave wall disposed vertically, whereby the collection of light from extraneous sources above and below said reflector and the effect of light from said source on said light-sensitive element are minimized.

4. In combination with a vehicle headlight having a dim circuit and a bright circuit, light-sensitive electrical switching apparatus for causing said bright circuit to be deenergized and said dim circuit energized upon the approach of another lighted vehicle travelling in the opposite direction comprising a gas-filled bulb enclosing a bimetallic cathode, a photo-grid, an anode spaced from said cathode, circuit means for applying a potential across said anode and cathode sufficient to cause the passage of electrons from said photo-grid to said anode when light falls on said photo-grid with consequent ionization of said gas and thereafter to cause the flow of current between said anode and said cathode whereby said bimetallic cathode is heated and caused to deform in response to the incidence of light upon said photo-grid, a first fixed contact in said bright circuit, a second fixed contact in said dim circuit, a movable contact movable between said first and second fixed contacts, a compression spring connected with said movable contact and disposed with its axis generally transverse to the direction of movement of said contact, and insulating means connecting said spring with said bimetallic cathode for causing the axis of said spring to shift relative to said movable contact upon deformation of said bimetallic cathode to cause said movable contact to snap back and forth between said first and second fixed contacts under the control of said cathode to alternately energize said bright and dim circuits.

5. Electrical switching apparatus comprising a gas-filled electron tube, an expansible cathode, a photo-grid, an anode spaced from said grid, and a spring biased contact switch connected to the cathode, whereby actuation of the grid by light will cause the tube to conduct thereby causing the expansible cathode to heat, to change its shape, and to activate the contact switch to snap it from one position to another.

6. Light actuated electrical switching apparatus comprising a gas-filled electron tube, an element in said tube formed so that its configuration changes appreciably upon change in its temperature, a fixed contact in said tube, and a cooperating movable contact in said tube movable by said element relative to said fixed contact in response to temperature changes in said element accompanying the ionization and de-ionization of said gas in the course of the operation of said tube.

References Cited in the file of this patent

UNITED STATES PATENTS

| | | |
|---|---|---|
| 494,765 | Tyler | Apr. 4, 1893 |
| 1,747,648 | Ruben | Feb. 18, 1930 |
| 2,132,987 | Hopkins | Dec. 12, 1939 |
| 2,571,981 | Wensel | Oct. 16, 1951 |
| 2,807,752 | McIlvaine | Sept. 24, 1957 |